US011277356B2

(12) United States Patent
Catalano et al.

(10) Patent No.: US 11,277,356 B2
(45) Date of Patent: Mar. 15, 2022

(54) NETWORK BUFFER CREDIT ALLOCATION

(71) Applicant: International Business Machines Corporation, Armonk, NY (US)

(72) Inventors: Pasquale A. Catalano, Wallkill, NY (US); Christopher J Colonna, Ossining, NY (US); Stephen Robert Guendert, Poughkeepsie, NY (US); Michael James Becht, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 16/991,177

(22) Filed: Aug. 12, 2020

(65) Prior Publication Data

US 2022/0052968 A1 Feb. 17, 2022

(51) Int. Cl.
*H04L 12/26* (2006.01)
*H04L 49/9005* (2022.01)
*H04L 47/127* (2022.01)
*H04L 67/1097* (2022.01)
*H04L 49/356* (2022.01)

(52) U.S. Cl.
CPC ........ *H04L 49/9005* (2013.01); *H04L 47/127* (2013.01); *H04L 49/357* (2013.01); *H04L 67/1097* (2013.01)

(58) Field of Classification Search
CPC ............... H04L 43/026; H04L 43/0876; H04L 47/2441; H04L 67/1097; H04L 12/56; G06F 15/173
USPC ......................................................... 370/351
See application file for complete search history.

(56) References Cited

U.S. PATENT DOCUMENTS 6,289,386 B1   9/2001   Vangemert
8,295,293 B1   10/2012   Brown
8,325,723 B1   12/2012   Wang
(Continued)

FOREIGN PATENT DOCUMENTS

EP        1013036 A1    2/2010

OTHER PUBLICATIONS

Varadarajan, "ETheReal: A Fault Tolerant Host—Transparent Mechanism for Bandwidth Guarantees over Switched Ethernet Networks", Dissertation paper, Aug. 2000, 165 pps., <https://pdfs.semanticscholar.org/3c62/b4654892141feca0ef8cc4622f2a25f0981d.pdf>.

*Primary Examiner* — Robert J Lopata
(74) *Attorney, Agent, or Firm* — Edward J. Wixted, III

(57) ABSTRACT

A method for dynamically allocating buffer credits between a system and a storage area network (SAN). The method includes one or more computer processors determining a forecast of a change related to a pattern of network traffic that originates from a computing system that links to a storage area network (SAN) via a network connection. The method further includes determining whether the forecast change related to the pattern of network traffic dictates a change to a buffer credit allocation associated with the network connection. The method further includes responding to determining that the forecast change related to the pattern of network traffic dictates the buffer credit allocation change by determining a value for the buffer credit allocation associated with the change. The method further includes transmitting a request to a switch of the SAN to modify a buffer credit allocation value corresponding to a port of the switch linked to the network connection.

20 Claims, 4 Drawing Sheets

(56) References Cited

U.S. PATENT DOCUMENTS

| | | |
|---|---|---|
| 9,042,398 B2 | 5/2015 | Lee |
| 9,426,083 B2 | 8/2016 | Ziegler |
| 9,571,408 B2 | 2/2017 | Aingaran |
| 10,061,734 B2 | 8/2018 | Hathorn |
| 10,469,395 B2 | 11/2019 | Seely |
| 2003/0126223 A1 | 7/2003 | Jenne |
| 2003/0229714 A1 | 12/2003 | Kiremidjian |
| 2011/0110232 A1* | 5/2011 | Abraham ............ H04L 41/5025 370/235 |
| 2011/0110241 A1* | 5/2011 | Atkinson ................ H04L 41/22 370/242 |
| 2011/0188507 A1* | 8/2011 | Watts .................... G06F 15/173 370/401 |
| 2013/0258851 A1* | 10/2013 | Mayya .................... H04L 47/32 370/235 |
| 2013/0343186 A1 | 12/2013 | Gnanasekaran |
| 2015/0341239 A1* | 11/2015 | Bertran Ortiz ..... H04L 67/1097 709/224 |
| 2016/0196366 A1* | 7/2016 | Astigarraga .......... G06F 30/367 703/13 |
| 2016/0239185 A1* | 8/2016 | Balimidi ............. G06F 3/0482 |
| 2019/0207818 A1* | 7/2019 | Niestemski ........... H04L 41/065 |
| 2020/0412669 A1* | 12/2020 | Schubert ................ H04L 49/25 |

\* cited by examiner

NETWORK BUFFER CREDIT ALLOCATION

BACKGROUND OF THE INVENTION

The present invention relates generally to the field of network communications, and more particularly to dynamic flow control associated with storage area networks.

Network fabrics utilize various technologies and topologies to provide servers with access to data distributed among various device and locations. Ethernet and Internet protocol (IP) networking do not require pre-defined client/server relationships, allow for data packet losses by retransmitting data, and provide high availability communications by connecting nodes in a mesh architecture. Fibre Channel (FC) storage area networks (SANs) are based on well-defined relationships (i.e., an initiator port and a target port) and include transport and services within the same devices. In addition, FC SANs are optimized for scale and availability. However, Fibre Channel communications require in-order, lossless raw block data transport.

Flow control is the process of managing the rate of data transmission between two nodes to prevent a fast sender from overwhelming a slow receiver. Ethernet is non-deterministic and flow control is destination-based. Ethernet networks utilize transmission control protocol (TCP) and can utilize a sliding window for flow control protocol and/or priority-based flow control. In each TCP segment, the receiver specifies in the receive window field the amount of additionally received data (in bytes) that it is willing to buffer for the connection. The sending host can send only up to that specified amount of data before the host must wait for an acknowledgement and window update from the receiving host. Ethernet flow control can be implemented at the data link layer.

Alternatively, Fibre Channel storage fabrics are deterministic and flow control is source-based. Transmission flow control within FC fabrics is implemented utilizing buffer-to-buffer credits. For example, a frame of data can be sent (i.e., transmitted) only if a server or switch has at least one buffer credit available. The value of buffer credits of a buffer credit allocation decreases in response to transmitting a frame of data and buffer credits are replenished (i.e., increase) in response to an acknowledgement that a frame of data is received, up to a maximum amount corresponding to the initial buffer credit allocation.

SUMMARY

According to an aspect of the present invention, there is a method, computer program product, and/or system for dynamically allocating buffer credits between a system and a storage area network (SAN). The method includes at least one computer processors determining a forecast of a change related to a pattern of network traffic that originates from a computing system that links to a storage area network (SAN) via a network connection. The method further includes at least one computer processor determining whether the forecast change related to the pattern of network traffic dictates a change to a buffer credit allocation associated with the network connection. The method further includes at least one computer processor responding to determining that the forecast change related to the pattern of network traffic dictates the buffer credit allocation change by determining a value for the buffer credit allocation associated with the change. The method further includes at least one computer processor transmitting a request to a switch of the SAN to modify a buffer credit allocation value corresponding to a port of the switch linked to the network connection.

DETAILED DESCRIPTION

Figure 1:
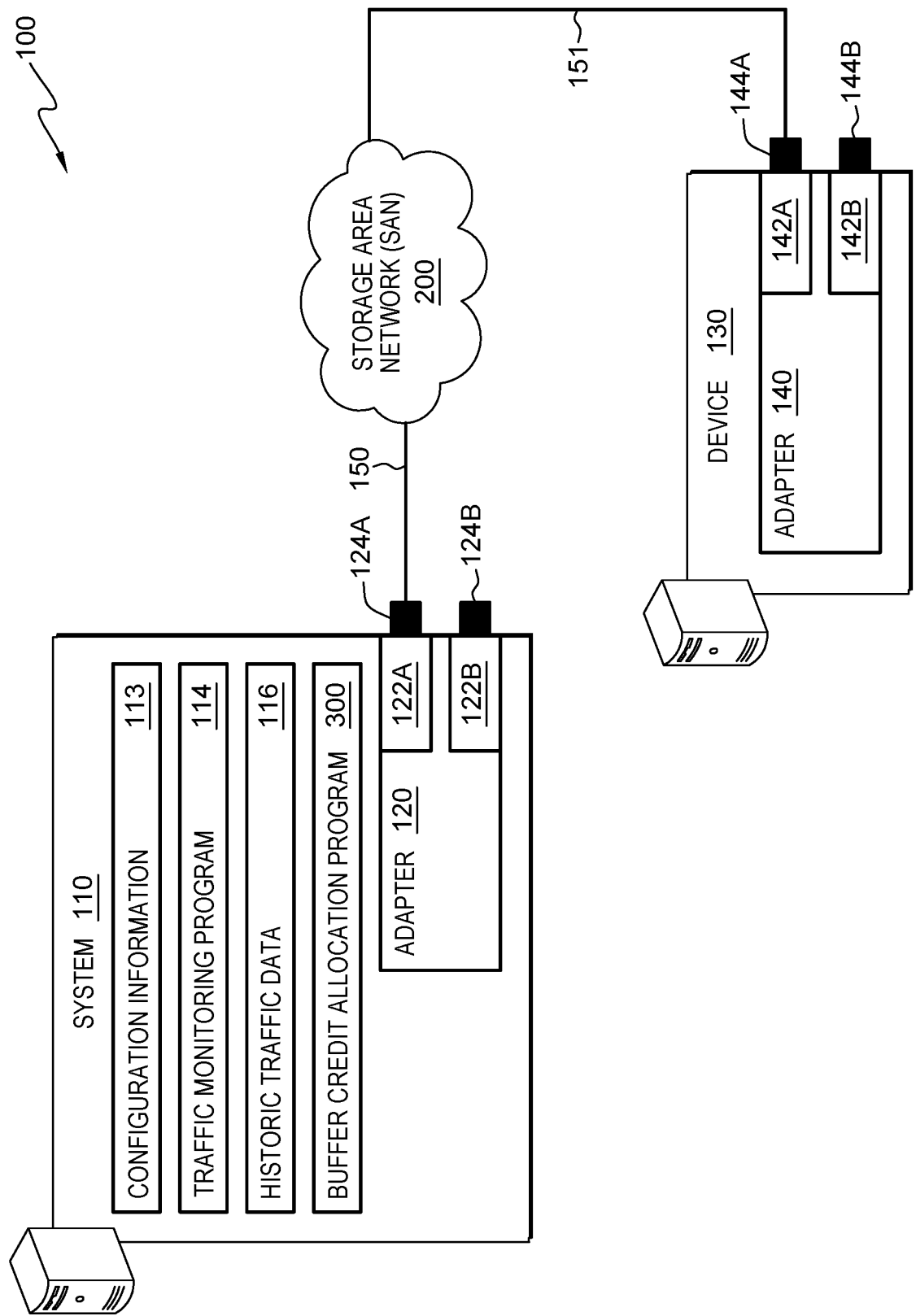
FIG. 1 illustrates a networked-computing environment, in accordance with an embodiment of the present invention.

Embodiments of the present invention recognize that some Storage Area Networks (SANs) control data and message transmission within the SAN fabric and one or more related endpoints (e.g., servers, storage systems, etc.) utilizing flow control based on buffer credits. Examples of technologies that utilize flow control based on buffer credits are Fibre Channel (FC) and Fibre Connection (FICON). Fibre Channel can refer to both the high-speed data transfer protocol and the related physical network technology.

Embodiments of the present invention recognize that buffer credit allocations associated with ports of network adapters, such as host bus adapters (HBAs) and ports of SAN switch are negotiated after a fabric login during a port login (PLOGI) associated with a channel, a device, a server, a network switch (hereinafter referred to as a switch), a storage system, etc. The number of allocated buffer credits associated with a port remains static while the network link between a pair of ports is active. Buffer credits (BCs) are only reallocated in response to a port or switch event that causes a channel or device to re-login to the SAN. In addition, some SANs, such as FC-based SANs include fabric services that can be executed utilizing in-band communications.

In Fibre Channel communications the basic unit of data transfer is a frame that includes information, controls, a data payload, etc., and a maximum size of 2148 bytes. Embodiments of the present invention recognize that each FC frame "consumes" one buffer credit independent of the size of the data payload (i.e., 0-2048 bytes) included within a FC frame.

Embodiments of the present invention also recognize that buffer credit usage varies based on the type and nature of the traffic (e.g., input/output (I/O) activity) being transmitted among the switches of the SAN and endpoints (e.g., ports) connected to the SAN. For example, "chatty" or high-volume network traffic with small data payloads can consume more buffer credits than large blocks of data transmitted as full-size frames. Similarly, I/O activity related to an executing workload can vary, producing periods of time when allocated BCs are underutilized and other periods when a port becomes an I/O bottle-neck due to an insufficient quantity of BCs.

Embodiments of the present invention also recognize that some workloads send and/or receive information from a plurality of endpoints accessible via the SAN. Therefore, BC allocation will vary across the SAN fabric as a workload executes. In addition, a SAN can process network traffic for a plurality of workloads initiated from different servers, potentially causing traffic bottlenecks among the inter-switch links (ISLs) of the SAN or over allocating BCs to a slow-drain device associated with an endpoint.

Embodiments of the present invention further recognize that each switch of a SAN includes a plurality of ports. Groups of ports within a SAN switch allocate BCs from a shared pool memory included within an application-specific integrated circuit (ASIC) operatively coupled to a group of ports, such as 8 ports or 16 ports within a switch. Further, an ASIC within a switch supports both receiving and transmitting ports (e.g., FC or FICON ports). Thus, embodiments of the present invention recognize that a switch of a SAN must be allocate BCs among receiving and sending ports to prevent starving some network connects of BCs or creating a lock-out scenario that prevents other devices from utilizing the SAN because of lack of BCs to allocate to a previously unused port. Manufacturer of some network switches include default buffer credit allocation settings that prevent a lock-out scenarios but require a manual override to change the default BC allocation.

Embodiments of the present invention can utilize various physical factors associated with a SAN fabric and one or more network connections, such as a distance of a connection between ports, a speed associated with a connection, and an average frame size to determine a BC allocation required to support a given quantity of input/output (I/O) (e.g., network) traffic. Embodiments of the present invention allow either a system (e.g., server, host, etc.) or a switch of a SAN to initiate a dynamic BC allocation change based on historic traffic patterns, real-time traffic patterns, and/or other events to ensure better utilization of the SAN and reduce latency of traffic within the SAN fabric.

Embodiments of the present invention can forecast changes to network traffic originating from a host, such as large/small frames, average frame size, variances of I/O activity, historic batch windows, etc.; and pre-emptively utilize in-band communications to a CUP (Control Unit Port) or a "well-known address" associated with a SAN switch to transmit a BC allocation change request. For example, embodiments of the present invention can utilize in-band communications to a CUP of a FICON-based SAN to request a BC increase in response to forecasting a period (i.e., interval) of "chatty traffic" and subsequently initiate a BC decrease when large block data transfers are forecast. Similarly, well-known addresses can be utilized for in-band communications within a FC SAN to access various services and functions, including requests to change a BC allocation and communicating information associated with an executing workload.

Embodiments of the present invention can also verify that one or more elements of the networked-computing environment can support and implement dynamic BC changes. Some embodiments of the present invention enable a switch of a SAN to interface with a host to increase a BC allocation corresponding to a network port in response to determining that additional bandwidth is available among the inter-switch links (ISLs) so that the host can supply an increase of I/O traffic to the SAN. Similarly, switches associated with FC ISLs can utilize in-band communications to reallocate BCs among switch ports based on changes within the SAN fabric, such as aggregating volumes of traffic based on historical information related to workloads utilizing the SAN, or responding to events associated with the SAN that are communicated via a registered state change notification (RSCN), such as connecting a new device or detecting a loss of an ISL.

Further embodiments of the present invention store information within the SAN related to an aggregation of historical traffic patterns and occurrences of workloads that utilize the SAN. The aggregated historical traffic patterns and identified affects within the SAN are utilized to dynamically reconfigure the BC allocations among ISLs and various ports, and to apply constraints to BC allocations based on forecasts related to aggregated historical traffic patterns produced by a plurality of workloads that are utilizing the SAN. In addition, an embodiment of the present invention can respond to information received from a host indicating that current pattern of network traffic may differ from a historic traffic pattern for a workload. For example, if host indicates that a workload is executing slower (e.g., at a lower priority), then the pattern of network traffic associated with the workload may extend over a longer duration and the network traffic rate associated with a portion of the workload may be proportionally reduced; thus, reducing the BCs needed to support the pattern of network traffic.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked-computing environment 100, in accordance with embodiments of the present invention. In an embodiment, networked-computing environment 100 includes system 110 and device 130 interconnected via a storage area network (SAN) 200 via respective network connections, such as network connection 150 and network connection 151. In various embodiments, networked-computing environment 100 includes more than one instance of system 110 and/or device 130 and respective network connections 150 and 151. SAN 200 is described in further detail with respect to FIG. 2.

In one embodiment, network connection 150 and network connection 151 are representative of fiber optic network connections. In some embodiments, one or more of network connection 150 and/or network connection 151 are representative of electrical network connection that utilize a protocol that employs BCs for flow control. In various embodiments, instances of network connection 150 and/or 151 can include a separate sending (e.g., originating or source) channel and a receiving channel. In other embodiments, networked-computing environment 100 can include elements that employ a different network protocol that does not utilize BCs. For example, networked-computing environment 100 may include an instance of SAN 200 that includes a converged network adapter (CNA), an instance of device 130, and a respective instance of network connections 151 operating utilizes another network protocol, such as transmission control protocol (TCP).

System 110 may be a laptop computer, a tablet computer, a netbook computer, a personal computer, a desktop computer, a personal digital assistant (PDA), a smart phone, a wearable device (e.g., smart glasses, a smart watch, an e-textile, an AR headset, etc.), or any programmable computer systems known in the art. In certain embodiments, system 110 represents a computer system utilizing clustered computers and components (e.g., database server computers, mainframe computers, application server computers, etc.) that act as a single pool of seamless resources when accessed through a network (not shown), as is common in data centers and with cloud-computing applications.

In some embodiments, device 130 represents a computer system, a storage system, etc., utilizing clustered computers and components (e.g., database systems, storage tiering systems, network-attached storage (NAS) devices, etc.) that act as a single pool of seamless resources when accessed through SAN 200 or another network (not shown), as is common in data centers and with cloud-computing storage systems.

In general, system 110 and device 130 are representative of any programmable electronic device or combination of programmable electronic devices capable of executing machine readable program instructions and communicating via SAN 200. In various embodiments, system 110 utilizes SAN 200 to communicate with one or more instances of device 130. System 110, instances of device 130, and SAN 200 may include components, as depicted and described in further detail with respect to FIG. 4, in accordance with embodiments of the present invention.

System 110 includes configuration information 113, traffic monitoring program 114, historic traffic data 116, buffer credit allocation program 300, and adapter 120. System 110 may also include various programs and data (not shown), such as application program interfaces (APIs), one or more communication programs, a hypervisor, a system management facility (SMF), a load balancer, a network interface program, application programs that execute various workloads, system logs and event files, user data, etc. In some embodiments, system 110 shares information with SAN 200, such as a portion of historic traffic data 116 and/or analyses related to a workload (not shown) for aggregation and analysis to improve the operation of SAN 200.

Configuration information 113 includes a plurality of information associated with system 110 communicating with one or more instances of device 130 via SAN 200, such as a maximum speed related to network connection 150, a distance of network connection 150, login information utilized during PLOGI to SAN 200, etc. System 110 may utilize one or more included programs, such as a SMF, hypervisor, a network interface program, etc., to obtain or update information included within configuration information 113. In an embodiment, aspects of buffer credit allocation program 300 can modify some information included within configuration information 113, such as a current BC allocation corresponding to buffers 122A and port 124A.

In various embodiments, configuration information 113 also includes information related to the capabilities and settings corresponding to the one or more instances of adapter 120 included within system 110, such as a maximum buffer size corresponding to buffers 122A and 122B, default BC allocations corresponding to buffers 122A and 122B, current BCs respectively allocated to buffer 122A and 122B, IDs corresponding to port 124A and port 124B, an ID corresponding to an instance of adapter 120, a transmission rate corresponding to port 124A, etc.

In some embodiments, configuration information 113 also includes information and/or factors received from SAN 200, such as buffer credit limits, rules, criteria, and/or constraints; identified changes that occur within SAN 200 and/or networked-computing environment 100 that affect accessing an instance of device 130; etc. Rules may apply to the entire fabric of SAN 200, a single device within SAN 200, a group of devices within SAN 200, a single port, and/or a group of ports within networked computing environment 100. A rule related to configuration information 113 may indicate whether a BC allocation change is fully or partially implemented, or another rule can include a BC change threshold that indicates whether a requested BC allocation change is executed (e.g., triggered). For example, if a forecast change to a pattern of network traffic is less than a threshold level, then a BC allocation change is not initiated based on one or more criteria. Other rules may be based on manufacturer default settings included within a switch of SAN 200, such as a switch port BC allocation cannot be reduced to less than 50% of the preset minimum value or increased to more than 125% of BC allocation based on the speed and distance of a network connection. Criteria may include a workload execution priority, identifying a level of network activity within SAN 200, determining whether a BC allocation change occurs for less than a threshold duration, etc.

Traffic monitoring program 114 is a program that monitors and analyzes network traffic patterns related to various workloads (not shown) that execute on system 110 and utilize SAN 200 to access one or more instances of device 130. A set of analyses related to a workload and a corresponding pattern of network traffic may include a direction (e.g., sending or receiving), time-based (i.e., time-variant) information, a size value related to generated data blocks, indications of bursty/chatty activity (e.g., high packet count with small frame sizes), an average frame size during a given period of time of the executing workload, data types, percentage of data to metadata, etc. In one embodiment, traffic monitoring program 114 performs one or more time-series analyses and/or time-series segmentation analyses (e.g., network traffic forecasts, patterns of activity, etc.) for a workload and respectively associate the time-based analyses with each port of adapter 120 that the workload utilizes to access SAN 200, such as port 124A. In various embodiments, traffic monitoring program 114 stores the results (e.g., sets of time-variant data and/or analyses) related to a time-series analyses and/or time-series segmentation analyses corresponding to a workload within historic traffic data 116.

In some embodiments, traffic monitoring program 114 further analyzes the I/O activity (i.e., network traffic) of a workload with respect to different occurrences of the workload at different times or levels of loading for system 110. In one example, traffic monitoring program 114 may determine that during certain dates or periods of time, the same workload generates a different pattern of network activity (e.g., additional I/O activity), such as at the end of a calendar quarter; or executes more slowly in or around a given date, such as during a holiday shopping period. In another example, traffic monitoring program 114 may analyze network traffic patterns of a workload relative to other workloads executing on system 110 or a priority assigned to the workload. In another embodiment priority is assigned via the Workload Manager component of the z/OS® system (referred to as WLM). Therefore, traffic monitoring program 114 may store sets of I/O analyses within historic traffic data 116 based additional criteria or information, such as dates within a year. Traffic monitoring program 114 may also generate forecasts and analyses for aggregated I/O activity of a plurality of executions of the workload.

In an embodiment, traffic monitoring program 114 performs real-time analyses or monitoring of network traffic related to a workload as the workload executes within system 110 to determine one or more changes to a forecast of network traffic (e.g., traffic patterns) across network connection 150. In a further embodiment, traffic monitoring program 114 further includes information within configuration information 113 and/or information received from SAN 200 within one or more analyses of a set of analyses, such as factoring in BC allocations affecting I/O activity, information related to SAN 200, quality-of-service (QoS) dictates, etc.

Historic traffic data 116 includes one or more sets of analyses generated by traffic monitoring program 114 and respectively associated with one or more previous executions a workload within system 110 that utilize SAN 200 to access one or more instances of device 130. In an embodiment, historic traffic data 116 is structured as a database or other associative data structure. In various embodiments, historic traffic data 116 can include differing patterns or forecasts of network traffic based on various criteria, such as a group of workloads executing on system 110, a time of day, a time/date within a year, an execution priority, a configuration corresponding to system 110 (e.g., an allocation of computing resources), configuration information received from SAN 200, etc. Historic traffic data 116 can include a more granular distribution of network traffic data that is further based on a plurality of instances of device 130 accessed by a workload. In some embodiments, historic traffic data 116 includes various sets of analyses corresponding to a workload based on differing criteria and/or execution conditions.

In one embodiment, buffer credit allocation program 300 is a program that dynamically negotiates BC allocations with SAN 200 between two linked network ports based on forecasting a change of I/O activity (e.g., a pattern of network traffic) associated with a workload. In an embodiment, buffer credit allocation program 300 utilizes historic traffic data 116 to forecast a change to a pattern of network traffic between system 110 and SAN 200. In response to forecasting a change to a pattern of network traffic, buffer credit allocation program 300 pre-emptively requests a BC allocation change to support the change of network traffic. In one example, based on known or determined delays related to modifying buffer credit allocations, buffer credit allocation program 300 can request SAN 200 to change a BC allocation a threshold quantity of time before a forecast change of network traffic occurs. In another examples, buffer credit allocation program 300 utilize real-time results of traffic monitoring program 114 to send a request to SAN 200 to initiate a BC allocation change.

In some embodiments, buffer credit allocation program 300 utilizes various rules and/or criteria to prevent BC allocations that "starve" (e.g., severely limit network traffics) some devices, generate lock-out conditions that prevent additional devices from connecting to SAN 200, and/or check for dead-lock conditions that leave a minimum number of BCs unallocated directly related to the number of ports that are offline or do not have any devices currently logged into a port. In various embodiments, buffer credit allocation program 300 also utilizes configuration information associated with SAN 200 and/or system 110 to determine whether a forecast change of network traffic triggers a BC allocation change. Buffer credit allocation program 300 can also determine whether one or more elements of networked-computing environment 100 can implement and/or support dynamic BC allocation changes.

In a further embodiment, an instance of buffer credit allocation program 300 can be installed within one or more switches of SAN 200 to dynamically reallocate BCs between linked network ports within SAN 200, between a network port of SAN 200 and a network port of an instance of device 130, and/or a port of SAN and a network port of system 110 in response to one or more events or changes associated with SAN 200. Instances of system 110 within networked-computing environment 100 can upload (e.g., share) analyses and/or patterns of network traffic associated with executing workloads to SAN 200 for aggregation and analysis among the switches of SAN 200. In some scenarios, instances of buffer credit allocation program 300 executing within SAN 200 reallocate BC allocations among ISLs based on priorities and/or QoS dictates among workloads or instances of system 110 that utilize SAN 200 to access a plurality of instances of device 130 within networked-computing environment 100. In other scenarios, instances of buffer credit allocation program 300 executing within SAN 200 reallocate BCs based on forecasts and/or analyses relate to aggregating network traffic within SAN 200 utilizing historic patterns of network traffic and sets of time-based analyses associated with a plurality of workloads executing within networked-computing environment 100.

Adapter 120 is representative of an HBA utilized by system 110 to communicate with SAN 200. Adapter 120 interfaces with SAN 200 via port 124A and network connection 150. In addition, adapter 120 includes circuitry and controls (not shown) for allocating, consuming, and replenishing BCs. In one embodiment, adapter 120 is representative of an HBA based on optical transmission technologies such as a FC adapter or a FICON adapter respectively associated with a fiber optic instance of network connection 150. In another embodiment, adapter 120 is based on non-fiber optic technology that utilizes buffer credits for flow control.

Adapter 120 includes buffer 122A and buffer 122B respectively coupled to port 124A and port 124B (i.e., node ports [N_Ports]). In various scenarios, ports 124A and 124B can also be referred to as host ports facing a switch included within SAN 200 (described in further detail with respect to FIG. 2) that includes target ports corresponding to a network connection, such as network connection 150. In some embodiments, buffer 122A and buffer 122B are buffers operatively coupled to respective port 124A and port 124B; and include a fixed amount of buffer memory (e.g., a maximum BC allocation). In a further embodiment, adapter 120 includes a pool of buffer memory that can be distributed among at least buffer 122A and buffer 122B of an instance of adapter 120 for allocating BCs to respective ports 124A and 124B. For example, a further instance of adapter 120 may include capabilities similar to an ASIC of a network switch.

Device 130 is a representative of a storage device or a storage system that includes information resources (not shown), such as files, databases, etc., utilized by one or more workloads (not shown) that execute on a system within networked-computing environment 100, such as system 110. For example, device 130 may be a network-attached storage (NAS) system, a tape library, an optical disk jukebox, flash storage system, etc. In one embodiment, device 130 includes one or more instances of adapter 140. In some embodiments, a plurality of instances of device 130 are operatively coupled to SAN 200 via respective instances of adapter 140, a network port, and corresponding instances of network connection 151. In various embodiments, an instance of device 130 includes an instance of adapter 140 that utilizes buffer credits for flow control and can interface with an instance of buffer credit allocation program 300 executing within a switch of SAN 200 via in-band communications.

In other embodiments, other instances of device 130 utilize different network communication technologies, protocols, and correspondingly different instances of network connection 151. For example, another instance of device 130 may include a network interface connection (NIC) version of adapter 140 that utilizes an electrically-based (e.g., twisted copper wire pairs) instance of network connection 151, such as an Ethernet connection. Further, this other instance of device 130 may be associated with a technology and protocol that does not utilize buffer credits for flow control in response to communicating with SAN 200.

Adapter 140 includes buffers 142A and 142B respectively coupled to ports 144A and 144B (i.e., N_Ports). In various scenarios, ports 144A and 144B are referred to as target ports facing a switch port (e.g., a Fabric port [F_Port]) (not shown) included within SAN 200. In some embodiments, buffer 142A and buffer 142B are buffers operatively coupled to respective port 144A and port 144B and include a fixed amount of buffer memory (e.g., a maximum BC allocation). In one embodiment, adapter 140 is representative of an HBA, such as a FC adapter or a FICON adapter based on optical transmission technology and respectively associated with a fiber optic instance of network connection 151 and utilizes BCs for flow control and can respond to in-band communications from SAN 200.

In an embodiment, buffer 142A can be configured for dynamic buffer credit allocation and responds to instructions originating from an instance of buffer credit allocation program 300 operating within a switch of SAN 200. In a further embodiment, buffer 142A and buffer 142B are representative of a distribution of buffer memory that is shared (e.g., a buffer pool) among ports 144A and 144B of adapter 140.

In other embodiments, adapter 140, ports 144A, and 144B are associated with another type of network adapter that communicates with SAN 200 via a wired (i.e., electrical) instance of network connection 151. In some scenarios, adapter 140 and at least port 144A can communicate with SAN 200 utilizes another protocol that employs BCs for flow control. In other scenarios, adapter 140 and at least port 144A can communicate with SAN 200 via a different protocol that does not utilize buffer credits, such as TCP.

In one embodiment, system 110 communicates through SAN 200 to device 130. SAN 200 can include, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, SAN 200 can include any combination of connections and protocols that will support communications between system 110 and device 130 in accordance with embodiments of the present invention. In various embodiments, SAN 200 operates locally via wired, wireless, or optical connections and can be any combination of connections and protocols (e.g., personal area network (PAN), near field communication (NFC), laser, infrared, ultrasonic, etc.).

Figure 2:
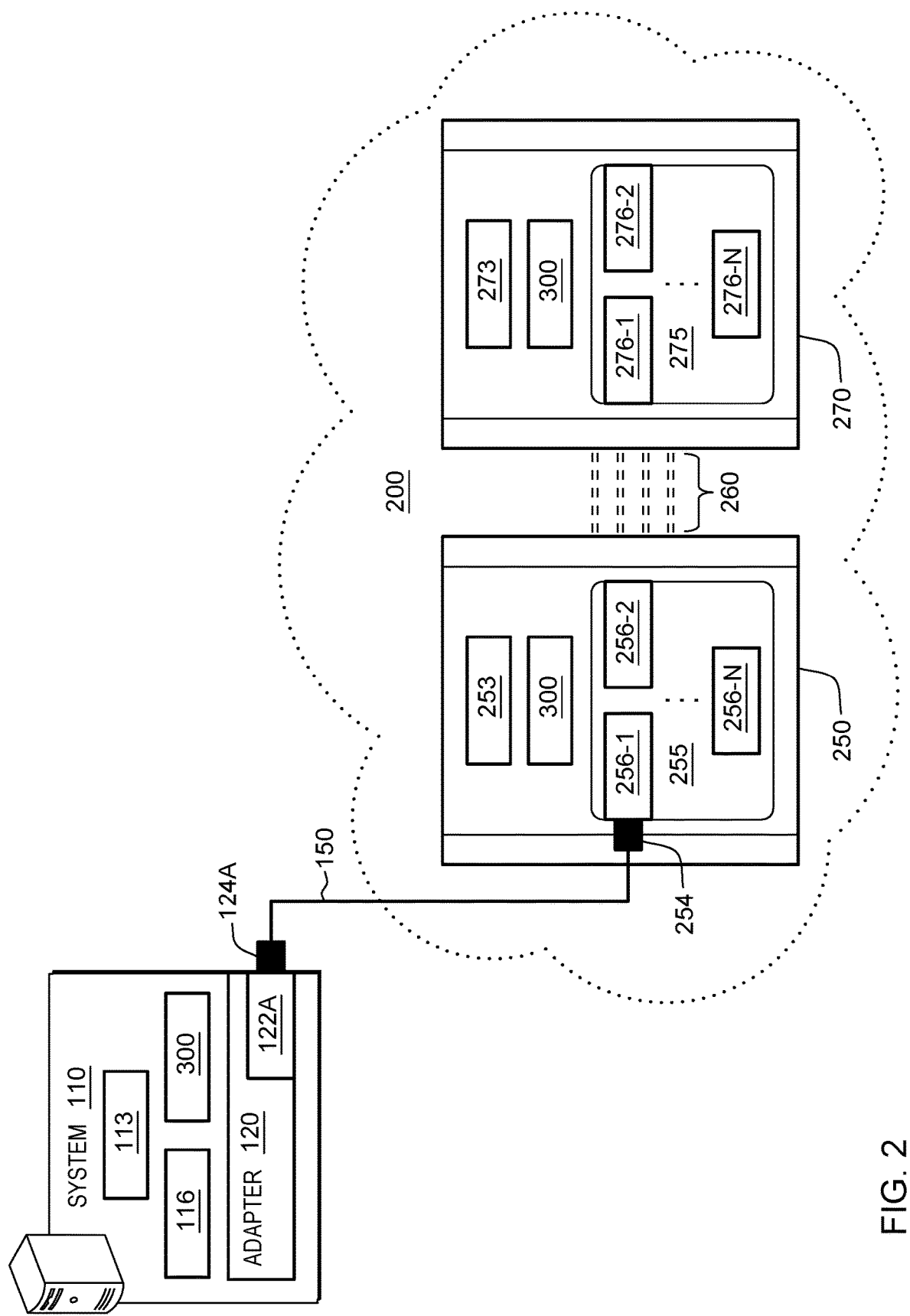
FIG. 2 depicts a block diagram that include additional details related to a storage area network within a networked-computing environment, in accordance with an embodiment of the present invention.

FIG. 2 is a functional block diagram further illustrating aspects of SAN 200 operating within networked-computing environment 100, in accordance with embodiments of the present invention. In an embodiment, SAN 200 includes a plurality of network switches represented by switch 250 and switch 270, and a plurality of inter-switch links (ISLs) represented by the group of dashed double lines of ISL 260. In various embodiments, the switches of SAN 200 can be grouped within a physical location and/or can be distributed among a plurality of differing physical/geographic locations and interconnected via a plurality of ISLs (e.g., ISL 260). For example, switch 250 and switch 270 may be separated by 20 kilometers and interconnected via a plurality of fiber optic cables and/or optical transport equipment (e.g. Dense Wavelength Division Multiplexers, optical amplifiers, etc.) that represent a portion of ISL 260. Instances of switch 250 and switch 270 may include components, as depicted and described in further detail with respect to FIG. 4, in accordance with embodiments of the present invention.

In various embodiments, SAN 200 includes other elements of hardware and software (not shown) utilized to practice various aspects of the present invention, such a routers; cabling; converged adapters/switches; a network-based instance of traffic monitoring program 114; local storage devices that include information and/or analyses associated with patterns of aggregated network traffic; network control and administrative software; a service element, such as a laptop, server, and/or an integrated display/administrative interface, etc., utilized to practice various aspects of the present invention.

In a further embodiment, one or more switches of SAN 200 can aggregate and/or analyze patterns of network traffic within and/or across SAN 200 generated by a plurality of workloads that execute within systems external to SAN 200, such as instances of system 110. SAN 200 may receive historic patterns of network traffic and/or analyses corresponding to a workload from a system, upload historic patterns of network traffic and/or analyses corresponding to a workload from a system, internally monitor and analyze network traffic corresponding to a plurality of workloads over time, or a combination thereof.

In an embodiment, an instance of switch 250 includes configuration information 253, one or more instances of ASIC 255 operatively coupled to respective sets of network communication ports (not shown), and firmware and other hardware elements (not shown) utilized to perform various functions within a SAN switch. The sets of network ports associated with switch 250 may be distributed among fabric ports (i.e., F_Ports), such as port 254 that communicates with an N_Port of a node (e.g., port 122A of system 110); and extender ports (i.e., E_Ports) (not shown) that interconnect switch 250 to one or more other switches, such as switch 270. In various embodiments, each network port of switch 250 further includes sending and receiving channels that can have differing BC allocations or is associated with a combined BC allocation. In some embodiments, one or more instances of switch 250 include an instance of buffer credit allocation program 300.

In an embodiment, configuration information 253 and configuration information 273 include configuration information associated with a plurality of ports and respective network connections and/or ISLs respectively associated with switch 250 and switch 270, such as port IDs, BC allocations, manufacturer's pre-sets or defaults, etc. Configuration information 253 and/or configuration information 273 may also include other respective information and/or factors previously discussed with respect to configuration information 113 of system 110 but as related to respective instances of switch 250 and/or switch 270.

In an embodiment, ASIC 255 includes a set of memory buffers, represented by buffer 256-1, buffer 256-2, through buffer 256-N that are operatively coupled to a set of network ports (not shown). The memory buffers of ASIC 255 are also individually configurable. In one example, ASIC 255 can respond to an in-band command or request initiated by buffer control program 300 to allocate buffer credits (e.g., a number of frames) from the buffer memory (not shown) included within ASIC 255 and the memory buffer also associated with one or more ports or port IDs, such as buffer 256-1 and port 254. In another example, ASIC 255 can allocate BCs to one or more E_Ports in response to an in-band command or request initiated by buffer credit allocation program 300 executing within another switch of SAN 200, such as switch 270. In various embodiments, each BC is equal to 2148 bytes of buffer memory of ASIC 255.

In an embodiment, ISL 260 represents a plurality of network connections that interconnect instanced of switch 250 and switch 270 as a switched fabric within SAN 200. Each ISL of ISL 260 is a respective link (i.e., network connection) between a pair of E_Ports included within different network switches of SAN 200, such as switch 250 and switch 270. An ISL of ISL 260 may be associated with differing physical characteristics, such as a length (i.e., a distance), a transmission speed, etc.

In an embodiment, an instance of switch 270 includes configuration information 273, one or more instances of ASIC 275 operatively coupled to respective sets of network communication ports (not shown), and firmware and other hardware elements (not shown) utilized to perform various functions within a SAN switch. The sets of network ports associated with switch 270 may be distributed among F_Ports (not shown) that communicates with other nodes, such as instance of device 130; and E_Ports (not shown) that interconnect switch 270 to one or more other switches within SAN 200, such as switch 250. In various embodiments, each network port of switch 270 includes sending and receiving channels that can have differing BC allocations or is associated with a combined BC allocation. In some embodiments, instances of switch 270 can include an instance of buffer credit allocation program 300.

In an embodiment, ASIC 275 includes a set of memory buffers, represented by buffer 276-1, buffer 276-2, through buffer 276-N that are operatively coupled to a set of network ports (not shown). The memory buffers of ASIC 275 are also individually configurable. In one example, ASIC 275 can respond to an in-band command or request initiated by buffer control program 300 executing within switch 250 to reallocate BCs among buffers 256-1, 256-2, and 256-N associated with respective ISLs of ISL 260 based on a change to an aggregated pattern of network traffic within SAN 200.

Figure 3:
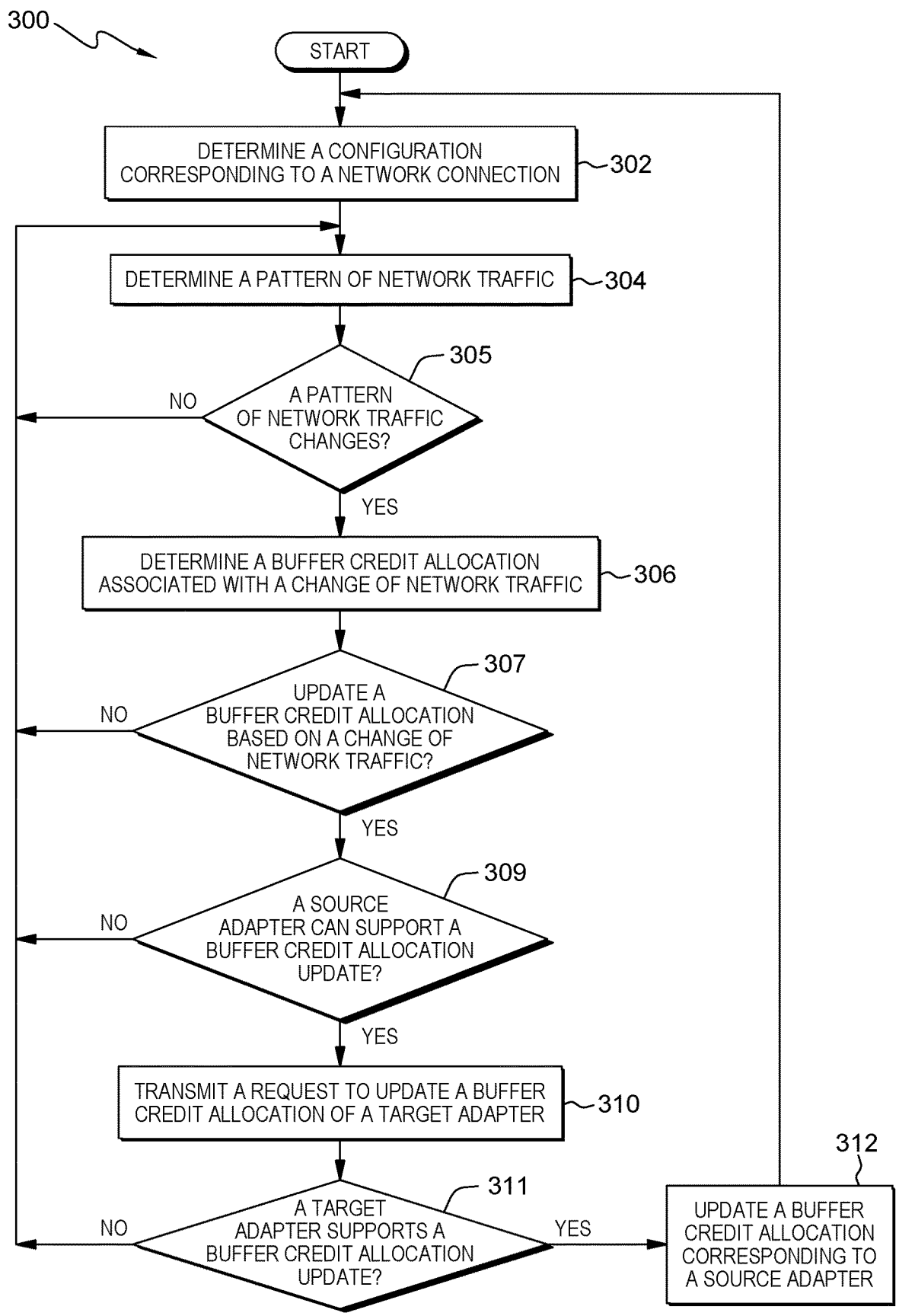
FIG. 3 depicts a flowchart of steps of a buffer credit allocation program, in accordance with an embodiment of the present invention.

FIG. 3 is a flowchart depicting operational steps for buffer credit allocation program 300, a program for dynamically controlling buffer credit allocations among systems and SANs that utilize buffer credits as a flow control mechanism, in accordance with embodiments of the present invention. In various embodiments, buffer allocation program 300 can monitor and control BC allocations among a plurality of concurrently operating network connections (not shown) between system 110 and SAN 200.

In some embodiments, buffer credit allocation program 300 modifies BC allocations between an N_Port (e.g., a source port, an initiator port) of a host or node linked/paired (i.e., network connected) to an F_port (e.g., fabric port, target port) included within a switch of SAN 200. In other embodiments, other instances of buffer credit allocation program 300 are included within switches of SAN 200 to dynamically control BC allocations among pairs of E_ports (not shown) corresponding to inter-switch links (ISLs) within SAN 200. In another embodiment, an instance of buffer allocation program 300 can also execute within a switch of the SAN 200 to modify BC allocations related to an F_Port of a switch included within SAN 200 and a linked N_Port corresponding to a target storage device that utilizes BCs for flow control.

In step 302, buffer credit allocation program 300 determines a configuration corresponding to a network connection. A configuration corresponding with a network connection may include a current BC allocation value, a connection speed (e.g., GB/sec), a connection distance, an ID corresponding to a port, an indication that the network connection supports in-band communications, etc. In one embodiment, buffer credit allocation program 300 determines a configuration corresponding to a network connection based on information exchanged during a port login (PLOGI) process associated with SAN 200. In another embodiment, buffer credit allocation program 300 determines a configuration corresponding to a network connection, such as port 124A and network connection 150 operatively couple to a port of SAN 200 based on information stored within configuration information 113 of system 110.

In a further embodiment, one or more other instances of buffer credit allocation program 300 executing within switches of SAN 200 can determine configuration information corresponding to one or more network connections based on information stored within configuration information 113 of system 110, configuration information 253 associated with switch 250, configuration information 273 associated with switch 270, and/or an ISL associated with ISL 260. For example, buffer credit allocation program 300 may determine that one or more ports of switch 250, a corresponding one or more ISLs of ISL 260, and related ports of switch 270 are configured based on default values, such as BC allocations values. In some scenarios, buffer credit allocation program 300 determines that a configuration corresponding to a network connection is based on minimum vendor settings for a port of a switch. In other scenarios, buffer credit allocation program 300 may determine that a network connection configuration information (not shown), such as a BC allocation is preset based on connection speed, a connection distance, and a default frame size.

Still referring to step 302, in some embodiments one or more instances of buffer credit allocation program 300 determine a change to one or more network connections associated with SAN 200 based on events associated with SAN 200 that are communicated via a registered state change notification (RSCN), such as a new instance of system 110 or device 130 connects to SAN 200, or a loss of an ISL or switch within SAN 200. In other embodiments, buffer credit allocation program 300 determines a configuration change to a network connection based on updating a BC allocation corresponding to a source adapter (step 312). Buffer credit allocation program 300 may store updated configuration information within configuration information 113.

In step 304, buffer credit allocation program 300 determines a pattern of network traffic. In one embodiment, buffer credit allocation program 300 forecasts (e.g., determines) a pattern of network traffic through network connection 150 corresponding to a first portion or period of time related to a workload (not shown) executing within system 110 based on accessing information and/or analyses included within historic traffic data 116. For example, buffer credit allocation program 300 determines that a workload initializes with a period (e.g., 30 seconds +/−5 seconds) of "chatty" traffic related to executing of security transactions. In another embodiment, buffer credit allocation program 300 forecasts another pattern of network traffic corresponding to subsequent portion or another period of time related to the workload executing within system 110, based on other information included within historic traffic data 116.

In some embodiments, buffer credit allocation program 300 modifies (e.g., compensates, adjusts, etc.) a forecasted pattern of network traffic for a workload based on information associated with one or more elements of networked-computing environment 100, such as a priority or an allocation of computing resource associated with the workload within system 110. In other embodiments, buffer credit allocation program 300 can utilize real-time information generated by traffic monitoring program 114 to identify a change to a pattern of network traffic associated with a workload that is not anticipated by information and/or sets of analyses included within historic traffic data 116 for a given workload. In response, buffer credit allocation program 300 modifies a forecast related to one or more patterns of network traffic based on the real-time information determined by traffic monitoring program 114.

Still referring to step 304, in a further embodiment one or more instances of buffer allocation program 300 executing within SAN 200 determine a change to a pattern of aggregated network traffic among one or more switches and/or ISLs of ISL 260 based on accessing information included within configuration information 253, configuration information 273, and/or uploaded to SAN 200 from a plurality of instances of system 110 and respectively associated workloads concurrently executing among the instances of system 110, such as instances of historic traffic data 116 associated with workloads executing within networked-computing environment 100.

In decision step 305, buffer credit allocation program 300 determines whether a pattern of network traffic changes. In one embodiment, buffer credit allocation program 300 determines that a pattern of network traffic through network connection 150 between system 110 and SAN 200 changes based on a network activity forecast associated with a workload, for a given period of time. In another embodiment, buffer credit allocation program 300 utilizes real-time analyses by traffic monitoring program 114 to identify a change to a pattern of network traffic that differs from historic traffic data 116 associated with the workload.

In a further embodiment, an instance of buffer allocation program 300, executing within a switch of SAN 200, determines that a change occurs among the aggregated patterns of network activity related to one or more ISLs of ISL 260 of SAN 200 during a given period of time. Buffer allocation program 300 can determine that a change occurs among the aggregated patterns of network activity related to one or more ISLs of ISL 260 based on information, data, and/or analyses included within configuration information 253, configuration information 273, and/or historic traffic data associated with a plurality of workload that execute among one or more instances of system 110 within networked-computing environment 100.

In various embodiments, responsive to determining that a pattern of network traffic does not change between system 110 and SAN 200 (No branch, decision step 305), buffer credit allocation program 300 loops to step 304 to determine and/or forecast another pattern of network traffic between system 110 and SAN 200 for a subsequent period of time. In a further embodiment, responsive to determining that a pattern of aggregated network traffic does not change within SAN 200 (No branch, decision step 305), buffer credit allocation program 300 loops to step 304 to determine and/or forecast another pattern of aggregated network traffic within and/or across SAN 200 for a subsequent period of time.

Referring to decision step 305, in various embodiment responsive to determining that a pattern of traffic through network connection 150 changes (Yes branch, decision step 305), buffer credit allocation program 300 determines a BC allocation associated with the change of network traffic between system 110 and SAN 200 (step 306). In a further embodiment, responsive to determining that a pattern of aggregated network traffic changes within SAN 200 (Yes branch, decision step 305), buffer credit allocation program 300 determines one or more BC allocation changes associated with the change of aggregated work SAN 200 (step 306), such as a BC allocation change corresponding to ports of affected ISLs within SAN 200.

In step 306, buffer credit allocation program 300 determines a buffer credit allocation associated with a change of network traffic. In some scenarios, a BC allocation for a source adapter and a linked target adapter can be shared among the sending and receiving channels. In an embodiment, buffer credit allocation program 300 determines a BC allocation based on a forecast pattern of network traffic for one or more periods of time and configuration information corresponding to a network connection. For example, based on a first period of time and a corresponding pattern of traffic through network connection 150, buffer credit program 300 determines a BC allocation related to port 254 (e.g., buffer 256-1 allocated from ASIC 255) and buffer 122A operatively coupled to port 124A.

In various embodiments, responsive to determining or forecasting a change to a pattern of network traffic, buffer credit allocation program 300 further determines whether a BC allocation change is triggered based on one or more criteria, rules, and/or thresholds included within configuration information 113. In one example, if buffer credit allocation program 300 determines that a change to a pattern of network traffic and correspond BC allocation occurs for less than a threshold duration, then buffer credit allocation program 300 determines not update a BC allocation. In another example, if buffer credit allocation program 300 determines that a BC allocation changes meets or exceeds one or more criteria, rules, and/or thresholds included within configuration information 113; then buffer credit allocation program 300 determines to update the current BC allocation based on the pattern of network traffic and corresponding BC allocation determination.

Still referring to step 306, in a further embodiment, responsive to determining that a change to the pattern of aggregated network traffic within and/or across SAN 200 changes, an instance of buffer allocation program 300 executing within a switch of SAN 200 determines a BC allocation corresponding to one or more pairs of E_ports (not shown) related to an ISL of ISL 260. The instance of buffer allocation program 300 executing within SAN 200 further determines whether one or more of the determined BC allocation changes are triggered based on one or more criteria, rules, and/or thresholds included within configuration information 253 and/or configuration information 273 (similar to criteria, rules, and/or threshold previously discussed with respect to configuration information 113).

In other embodiments, buffer credit allocation program 300 determines that based on information corresponding to one or more network connections and information from SAN 200 that the quantity of buffer credit available to allocate is constrained based on one or more other criteria. In one scenario, if SAN 200 is processing a large quantity of network traffic, then buffer credit allocation program 300 can be constrained to allocate less than the determined BC allocation. For example, based on various factors associated with networked computing environment 100 and the executing workload, buffer credit allocation program 300 may be constrained to allocate a percentage of determined BC allocation based on the priority assigned to the workload.

In another scenario, if the aggregated network traffic within and/or across SAN 200 exceeds a threshold level and/or the available (i.e., unallocated) BCs within one or more ASICs or switches within SAN 200 decreases below a threshold level, then buffer credit allocation program 300 may be required to recalculate BC allocations among a plurality of network connections so the BCs can be reallocated to other devices and/or network connections. In one example, buffer credit allocation program 300 reallocates BCs corresponding to one or more network connections based on additional instances of system 110 connecting to SAN 200. In another example, if an instance of device 130 becomes a "slow drain" device, then buffer credit allocation program 300 may reduce the BCs assigned to network connection 151 and reassign to BCs to a BC pool of a switch of SAN 200 that supports network connection 151.

In decision step 307, buffer credit allocation program 300 determines whether to update a buffer credit allocation based on a change of network traffic. In one embodiment, buffer credit allocation program 300 determines to update a BC allocation based on exceeding a threshold, a rule, and/or one or more criteria related to system 110 and/or an executing workload. In other embodiments, buffer credit allocation program 300 determines to update one or more BC allocations based on reallocating BCs in response to changes, rules (e.g., dictates), criteria, and/or thresholds associated with one or more changes related to networked-computing environment 100. In a further embodiment, buffer credit allocation program 300 determines to update one or more BC allocations based on reallocating BCs in response to changes, rules (e.g., dictates), criteria, and/or thresholds associated with aggregated network traffic within SAN 200.

In various embodiments, responsive to determining not to update a BC allocation based on a lack change of network traffic between system 110 and SAN 200 (No branch, decision step 307), buffer credit allocation program 300 loops to step 304 to determine and/or forecast another pattern of network traffic between system 110 and SAN 200 for a subsequent period of time. In a further embodiment, responsive to determining not to update a BC allocation based on a lack of change associated with the aggregated network traffic within and/or across SAN 200 (No branch, decision step 307), buffer credit allocation program 300 loops to step 304 to determine and/or forecast another pattern of aggregated network traffic within and/or across SAN 200 for a subsequent period of time. In other embodiments, responsive to determining not to update one or more BC allocations based on a network traffic change and/or a change associated with an aggregation of network traffic that does not meet or exceed rules, dictates, criteria, and/or thresholds (No branch, decision step 307), buffer credit allocation program 300 loops to step 304 to determine and/or forecast other patterns of network activity within networked-computing environment 100 for a subsequent period of time.

Referring to decision step 307, responsive to determining to update a BC allocation based on a change of network traffic between system 110 and SAN 200 (Yes branch, decision step 307), buffer credit allocation program 300 determines whether a source adapter can support a buffer credit allocation update (decision step 309). In a further embodiment, responsive to determining to update a BC allocation based on a change associated with of aggregated network traffic within and/or across SAN 200 (Yes branch, decision step 307), buffer credit allocation program 300 determines whether a source adapter can support a buffer credit allocation update (decision step 309). In other embodiments, responsive to determining to update one or more BC allocations based on a network traffic change meeting or exceeding rules, dictates, criteria, and/or thresh- olds (Yes branch, decision step 307), buffer credit allocation program 300 buffer credit allocation program 300 determines whether a source adapter can support a buffer credit allocation update (decision step 309).

In decision step 309, buffer credit allocation program 300 determines whether a source adapter can support a buffer credit allocation update. In one embodiment, buffer credit allocation program 300 determines that a source adapter, such as adapter 120 of system 110 can support a BC allocation update (e.g., increase or decrease) based on determining that configuration information 113 indicates that at least buffer 122A is configurable with respect to modifying BC allocation values. In another embodiment, buffer credit allocation program 300 further determines that a configurable source adapter, such as buffer 122A of adapter 120 can support the BC allocation update based on determining that buffer 122A has a quantity of unallocated buffer memory to increase the BC allocation corresponding to an adapter port, such as buffer 122A of port 124A, to a BC allocation value equal to or less that the BC allocation value determined in step 306.

In some embodiments, an instance of buffer credit allocation program 300 executing within a switch of SAN 200 determines that a source adapter, such as an ASIC and a corresponding E_Port included within a switch of SAN 200 can support buffer credit allocation updates based on configuration information corresponding to the switch that indicates that the adapter can respond to in-band commands or requests. In other embodiments, buffer credit allocation program 300 further determines whether a configurable source adapter, such as ASIC 255 of switch 250, can support at least a partial determined BC allocation increase (determined in step 306) for the ISL based on determining a quantity of unallocated and/or unreserved buffer memory within ASIC 255 is sufficient to at least partially increase the BC allocation. In a further embodiment, an instance of buffer credit allocation program 300 executing within a switch of SAN 200 determines that the switch within SAN 200 can support a plurality of BC allocation updates (e.g., increases and/or decreases) among a plurality of source adapters and respective buffers and E_ports (not shown) corresponding to a plurality of ISLs associated with ISL 206, and/or F_ports (not shown) networked to instances of device 130.

Responsive to determining that a source adapter cannot support a buffer credit allocation update (No branch, decision step 309), buffer credit allocation program 300 loops to step 304 to determine and/or forecast another pattern of network traffic within networked computing environment 100 for a subsequent period of time.

Referring to decision step 309, responsive to determining that a source adapter can support a buffer credit allocation update (Yes branch, decision step 309), buffer credit allocation program 300 transmits a request to update a credit allocation of a target adapter (step 310).

In step 310, buffer credit allocation program 300 transmits a request to update a buffer credit allocation of a target adapter. In one embodiment, buffer credit allocation program 300 utilizes system 110 and adapter 120 to transmit an in-band communications request to a switch of SAN 200 to update a BC allocation of a target adapter within SAN 200, such as buffer 256-1 of ASIC 255, to the determined BC allocation value. In response, buffer credit allocation program 300 receives an in-band response related to one or more aspects of target adapter, such as whether a determined BC allocation is fully allocated, partially allocated, or cannot be allocated, and/or a timestamp when the BC allocation update will occur.

In other embodiments, an instance of buffer credit allocation program 300 executing within a switch of SAN 200 utilizes in-band communications via an ISL of ISL 260 to request that a target adapter within another switch updates a BC allocation to a corresponding port (not shown) of the ISL connected to the other switch. For example, buffer credit allocation program 300 within switch 250 utilizes in-band communications via an ISL connected to switch 270 requests that ASIC 275 updates a buffer credit allocation to a corresponding port (not shown) of the ISL connected between switch 250 and switch 270. In another embodiment, an instance of buffer credit allocation program 300 executing within a switch of SAN 200 utilizes in-band communications to request a BC allocation update related to buffer 142A of adapter 140 included within device 130. In a further embodiment, an instance of buffer credit allocation program 300 can request to modify a plurality of BC allocation among the adapters (e.g., ports and ASICs) included within the switches of SAN 200.

In decision step 311, buffer credit allocation program 300 determines whether a target adapter supports a buffer credit allocation update. In addition, if buffer credit allocation program 300 determines that a target adapter can implement a BC allocation change request, either a full BC allocation update or partial BC allocation update, then another function (not shown) included within the target adapter, a system that includes the target adapter, and/or the switch that includes the target to execute the BC allocation update requested by buffer credit allocation program 300. In one embodiment, buffer credit allocation program 300 determines that a target adapter can support a BC allocation update based on information included within the configuration information associated with the target adapter, such as identifying a version of switch firmware that supports in-band communications related to BC allocation updates. In another example, buffer credit allocation program 300 determines that a target adapter can support a BC allocation update based on information received via in-band communications.

In some embodiments, buffer credit allocation program 300 determines that a target adapter can support a constrained BC allocation update based on information included within the configuration information corresponding to the target adapter, such as configuration information 253 of switch 250 and other information associated with networked-computing environment 100, such as a priority of the workload executing within system 110 and/or minimum BCs allocation among the plurality of ports (not shown) of switch 250. In another embodiment, if buffer credit allocation program 300 determines that an adapter of a switch includes sufficient unallocated BCs and/or underutilized BCs among other buffers, then buffer credit allocation program 300 can update (e.g., increase) a previous BC allocation corresponding to a buffer of the switch.

Still referring to decision step 311, in various embodiments buffer credit allocation program 300 determines that a target adapter cannot support a buffer credit update. In one scenario, buffer credit allocation program 300 determines that a target adapter cannot implement and/or support a BC allocation update via in-band communication based on firmware limitations. In another scenario, buffer credit allocation program 300 determines that a target adapter cannot implement and/or support a BC allocation update based on a constraint or rule affecting one or more switches of SAN 200. For example, buffer credit allocation program 300 may determine that the target adapter includes a constraint (e.g., a pre-set or a default value) by the manufacturer of the adapter that limits the BC allocation change that can be initiated via an in-band communication request to a 2× increase above the default value for a given port or a BC allocation cannot decrease a BC allocation to a port of an adapter below a default value set by the manufacturer of the switch and/or adapter.

Responsive to determining that a target adapter cannot support a buffer credit allocation update (No branch, decision step 311), buffer credit allocation program 300 loops to step 304 to determine and/or forecast another pattern of network traffic for a subsequent period of time.

Referring to decision step 311, in one embodiment responsive to determining that a target adapter supports a buffer credit allocation update, (Yes branch, decision step 311), buffer credit allocation program 300 updates a buffer credit allocation corresponding to a source adapter (step 312). In another embodiment, responsive to determining that a target adapter can support at least a partial buffer credit allocation update (Yes branch, decision step 311), buffer credit allocation program 300 updates a buffer credit allocation corresponding to a source adapter (step 312). In other embodiments, responsive to determining that a source adapter can support a buffer credit decrease, buffer credit allocation program 300 updates a buffer credit allocation corresponding to a source adapter (step 312).

In step 312, buffer credit allocation program 300 updates a buffer credit allocation corresponding to a source adapter. In one embodiment, buffer credit allocation program 300 increase (e.g., updates) a buffer credit allocation corresponding to buffer 122A of adapter 120 based on the BC allocation determined in step 306. In some embodiments, buffer credit allocation program 300 implements a partial BC allocation update/increase based on one or more previously discussed rules, constrains, dictates, and/or scenarios. In other embodiments, buffer credit allocation program 300 decreases a BC allocation corresponding to an adapter based on the BC allocation determined in step 306. In a further embodiment, an instance of buffer credit allocation program 300 updates the BC allocations among a plurality of ports and switches of SAN 200 base on previously determined BC allocations related to one or more events within networked-computing environment 100, such as a change related to an aggregated pattern of network activity within SAN 200 based on a plurality of workload, a loss of a ISL, etc.

In various embodiments, responsive to updating a buffer credit allocation corresponding to one or more source adapters, buffer credit allocation program 300 can continually loop to step 302 to determine a configuration corresponding to one or more network connections. In one scenario, buffer credit allocation program 300 loops to step 302 to determine a configuration corresponding to another network connection between system 110 and SAN 200. In another scenario, buffer credit allocation program 300 loops to step 302 to determine whether one or more configuration changes occur within networked-computing environment 100, such as adding or eliminating various network connections corresponding to one or more devices (e.g., other instances of device 130) or other instances of SAN 200. In some scenarios, buffer credit allocation program 300 loops but skips step 302. Instead, buffer credit allocation program 300 executes step 304 to determine a subsequent pattern of network traffic for a workload associated with system 110 and/or a change within an aggregated pattern of network traffic within and/or across SAN 200.

Referring to decision step 311, responsive to determining that a target adapter cannot support a buffer credit allocation update (No branch, decision step 311), buffer credit allocation program 300 loops to step 304 to determine a pattern of network traffic for a workload associated with system 110 and/or a change associated with the aggregated pattern of network traffic within and/or across SAN 200 associated with a subsequent period of time (step 304).

Figure 4:
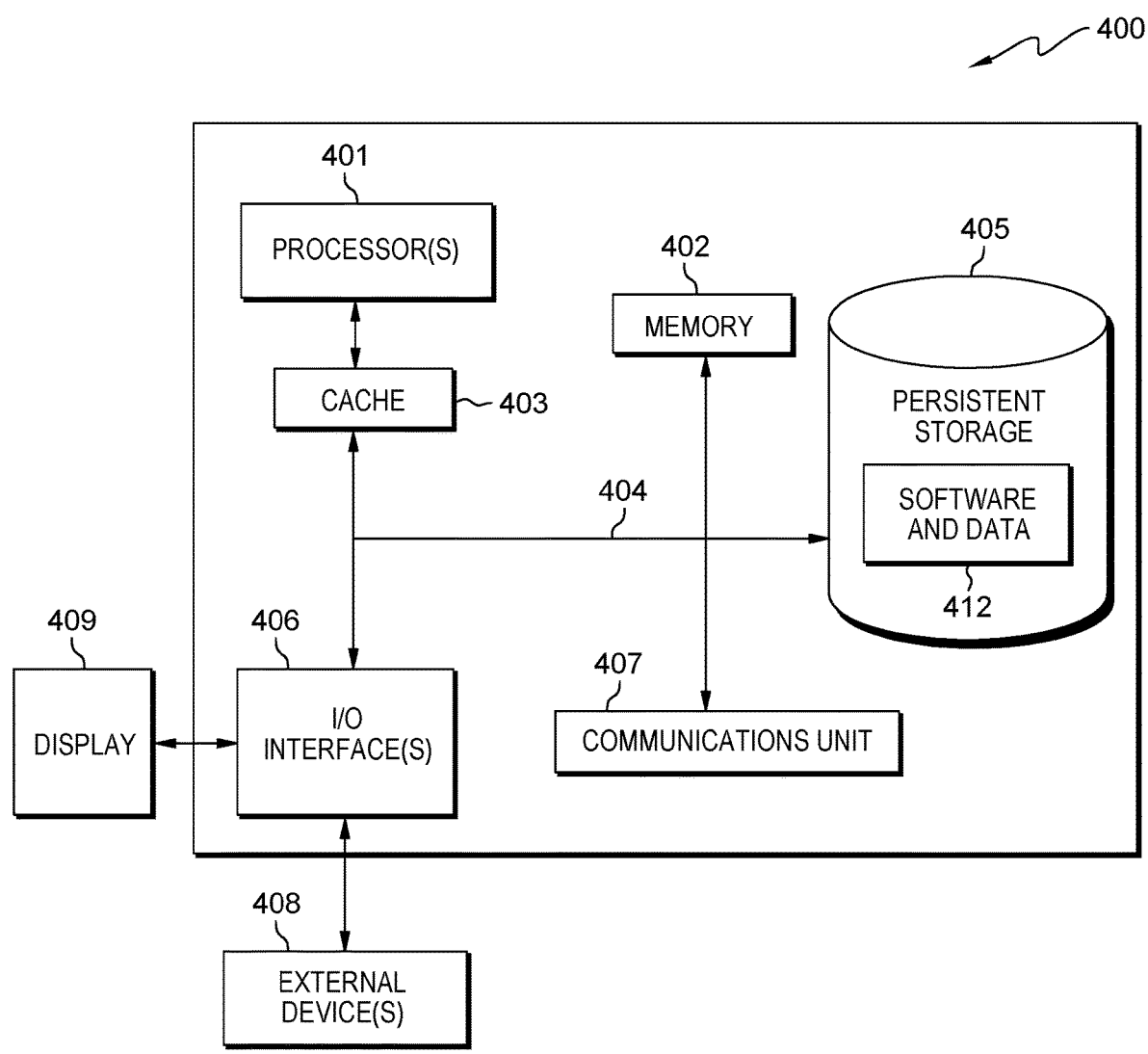
FIG. 4 is a block diagram of components of a computer, in accordance with an embodiment of the present invention.

FIG. 4 depicts computer system 400, which is representative of system 110 and device 130. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

In various embodiments, one or more components of SAN 200, such as switch 250 and switch 270 include various aspects of computer system 400. In some embodiments, other aspects of instances of switch 250 and switch 270 can further include aspects of computer system 400. For example, ASIC 255 of switch 250 and ASIC 275 of switch 270 may also include respective instances of processors(s) 401; communications fabric 404; I/O interface(s) 406, communications unit 407, and cache 403 (i.e., shareable buffer memory distributed among buffers 256-1, 256-1, through 256-N).

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 110, software and data 412 includes configuration information 113, traffic monitoring program 114, historic traffic data 116, buffer credit allocation program 300, and other programs and data (not shown). With respect to device 130, software and data 412 includes other programs and data (not shown). With respect to an instance of switch 250 and/or switch 270, software and data 412 includes respective configuration information 253 and configuration information 273, other data and programs (not shown). An instance of switch 250 and/or switch 270 and may further include an instance of buffer credit allocation program 300.

Communications unit 407, in these examples, provides for communications with other data processing systems or devices, including resources of system 110 one or more instance of device 130, and various elements of SAN 200. In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone. Alternatively, display 409 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    determining, by one or more computer processors, a configuration corresponding to a network connection that links a computing system and a storage area network (SAN);
    determining, by one or more computer processors, a forecast of a change related to a pattern of network traffic that originates from the computing system that links to the SAN via the network connection;
    determining, by one or more computer processors, whether the forecast change related to the pattern of network traffic dictates a change to a buffer credit allocation associated with the network connection;
    responsive to determining that the forecast change related to the pattern of network traffic dictates the buffer credit allocation change, determining, by one or more computer processors, a value for the buffer credit allocation associated with the forecast change; and transmitting, by one or more computer processors; a request to a switch of the SAN to modify a buffer credit allocation value corresponding to a port of the switch linked to the network connection.

2. The method of claim 1, wherein the configuration corresponding to the network connection includes information selected from the group consisting of: a data transmission speed value, an initial buffer credit allocation value, a length value of the network connection, and an average frame size value.

3. The method of claim 1, wherein:
the computing system communicates with the SAN via a frame-based protocol; and
the frame-based protocol further utilizes buffer credits for flow control.

4. The method of claim 3, wherein the frame-based protocol is Fibre Channel (FC).

5. The method of claim 1, further comprising:
responsive to transmitting the request to the switch of the SAN to modify a buffer credit allocation corresponding to the port of the switch linked to the network connection, receiving, by one or more computer processors, a response from the switch indicating that the switch can support a buffer credit allocation value equal to or less than the buffer credit value included within the transmitted request; and
updating, by one or more computer processors, a buffer credit allocation associated with an adapter of the computing system operatively coupled to the network connection and the switch of the SAN, wherein the value corresponding to the updated buffer credit is equal to the buffer credit allocation value corresponding to the switch and included within the received response.

6. The method of claim 1, wherein determining the forecast of the change related to the pattern of network traffic originating from the computing system further comprises:
identifying, by one or more computer processors, a workload that generates the network traffic that originates from the computing system;
accessing, by one or more computer processors, a set of time-based analyses of the network traffic corresponding to one or more previous executions of the workload; and
determining, by one or more computer processors, that another pattern of network traffic corresponding to the workload during a subsequent period of time differs from a current pattern of network traffic based on one or more factors.

7. The method of claim 6, wherein the set of time-based analyses of network traffic describes a respective pattern of network traffic that occurs during a corresponding interval of time while the workload executes and is associated with a given network connection.

8. A computer program product comprising:
one or more computer readable storage media and program instructions collectively stored on the one or more computer readable storage media, the program instructions comprising:
program instructions to determine a configuration corresponding to a network connection that links a computing system and a storage area network (SAN);
program instructions to determine a forecast of a change related to a pattern of network traffic that originates from the computing system that links to the SAN via the network connection;
program instructions to determine whether the forecast change related to the pattern of network traffic dictates a change to a buffer credit allocation associated with the network connection;
program instructions to, responsive to determining that the forecast change related to the pattern of network traffic dictates the buffer credit allocation change, determine a value for the buffer credit allocation associated with the forecast change; and
program instructions to transmit a request to a switch of the SAN to modify a buffer credit allocation value corresponding to a port of the switch linked to the network connection.

9. The computer program product of claim 8, wherein the configuration corresponding to the network connection includes information selected from the group consisting of a data transmission speed value, an initial buffer credit allocation value, a length value of the network connection, and an average frame size value.

10. The computer program product of claim 8, wherein:
the computing system communicates with the SAN via a frame-based protocol; and the frame-based protocol further utilizes buffer credits for flow control.

11. The computer program product of claim 10, wherein the frame-based protocol is Fibre Channel (FC).

12. The computer program product of claim 8, further comprising:
program instructions, collectively stored on the one or more computer readable storage media, to, responsive to transmitting the request to the switch of the SAN to modify a buffer credit allocation corresponding to the port of the switch linked to the network connection, receive a response from the switch indicating that the switch can support a buffer credit allocation value equal to or less than the buffer credit value included within the transmitted request; and
program instructions, collectively stored on the one or more computer readable storage media, to update a buffer credit allocation associated with an adapter of the computing system operatively coupled to the network connection and the switch of the SAN, wherein the value corresponding to the updated buffer credit is equal to the buffer credit allocation value corresponding to the switch and included within the received response.

13. The computer program product of claim 8, wherein program instructions to determine the forecast of the change related to the pattern of network traffic originating from the computing system further comprise:
program instructions identify a workload that generates the network traffic that originates from the computing system;
program instructions access a set of time-based analyses of the network traffic corresponding to one or more previous executions of the workload; and
program instructions to determine that another pattern of network traffic corresponding to the workload during a subsequent period of time differs from a current pattern of network traffic based on one or more factors.

14. The computer program product of claim 13, wherein the set of time-based analyses of network traffic describes a respective pattern of network traffic that occurs during a corresponding interval of time while the workload executes and is associated with a given network connection.

15. A computer system comprising:
one or more computer processors;
one or more computer readable storage media; and
program instructions stored on the computer readable storage media for execution by at least one of the one or more computer processors, the program instructions comprising:
program instructions to determine a configuration corresponding to a network connection that links a computing system and a storage area network (SAN);
program instructions to determine a forecast of a change related to a pattern of network traffic that originates from the computing system that links to the SAN via the network connection;
program instructions to determine whether the forecast change related to the pattern of network traffic dictates a change to a buffer credit allocation associated with the network connection;
program instructions to, responsive to determining that the forecast change related to the pattern of network traffic dictates the buffer credit allocation change, determine a value for the buffer credit allocation associated with the change; and
program instructions to transmit a request to a switch of the SAN to modify a buffer credit allocation value corresponding to a port of the switch linked to the network connection.

16. The computer system of claim 15, wherein the configuration corresponding to the network connection includes information selected from the group consisting of a data transmission speed value, an initial buffer credit allocation value, a length value of the network connection, and an average frame size value.

17. The computer system of claim 15, wherein:
the computing system communicates with the SAN via a frame-based protocol; and the frame-based protocol further utilizes buffer credits for flow control.

18. The computer system of claim 15, further comprising:
program instructions, collectively stored on the one or more computer readable storage media for execution by at least one of the one or more computer processors, to, responsive to transmitting the request to the switch of the SAN to modify a buffer credit allocation corresponding to the port of the switch linked to the network connection, receive a response from the switch indicating that the switch can support a buffer credit allocation value equal to or less than the buffer credit value included within the transmitted request; and
program instructions, collectively stored on the one or more computer readable storage media for execution by at least one of the one or more computer processors, to update a buffer credit allocation associated with an adapter of the computing system operatively coupled to the network connection and the switch of the SAN, wherein the value corresponding to the updated buffer credit is equal to the buffer credit allocation value corresponding to the switch and included within the received response.

19. The computer system of claim 15, wherein program instructions to determine the forecast of the change related to the pattern of network traffic originating from the computing system further comprise:
program instructions identify a workload that generates the network traffic that originates from the computing system;
program instructions access a set of time-based analyses of the network traffic corresponding to one or more previous executions of the workload; and
program instructions to determine that another pattern of network traffic corresponding to the workload during a subsequent period of time differs from a current pattern of network traffic based on one or more factors.

20. The computer system of claim 19, wherein the set of time-based analyses of network traffic describes a respective pattern of network traffic that occurs during a corresponding interval of time while the workload executes and is associated with a given network connection.

* * * * *